Figure 1:
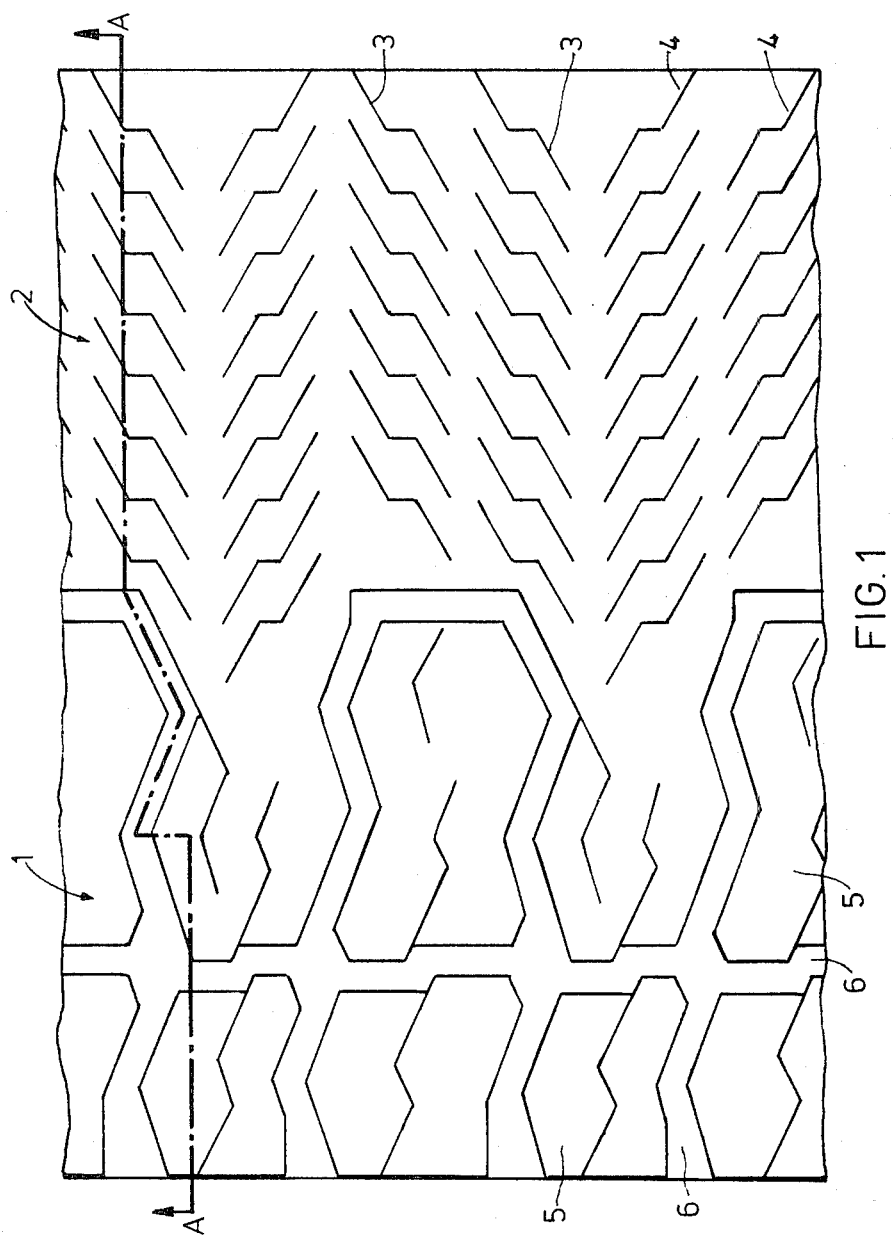

United States Patent [19]

Ippen et al.

[11] 4,429,728
[45] Feb. 7, 1984

[54] TIRE HAVING AN ASYMMETRICAL TREAD PROFILE

[75] Inventors: Jakob Ippen, Leverkusen; Friedel Stüttgen, Pulheim, both of Fed. Rep. of Germany

[73] Assignee: Bayer Aktiengesellschaft, Fed. Rep. of Germany

[21] Appl. No.: 401,570

[22] Filed: Jul. 26, 1982

[30] Foreign Application Priority Data

Aug. 1, 1981 [DE] Fed. Rep. of Germany ....... 3130574

[51] Int. Cl.³ .................... B60C 11/00; B60C 11/04; B60C 11/12
[52] U.S. Cl. ................ 152/209 A; D12/136
[58] Field of Search ....... 152/209 R, 209 A, 209 WT, 152/374, 209 NT, 209 D; D12/136

[56] References Cited

U.S. PATENT DOCUMENTS

| | | | |
|---|---|---|---|
| T973,007 | 8/1978 | Beyers | 152/209 A |
| 1,664,352 | 3/1928 | Coleman | 152/209 R |
| 2,130,524 | 9/1938 | Clark | 152/188 |
| 2,224,141 | 12/1940 | Clark | 152/188 |
| 3,162,229 | 12/1964 | Ellenrieder et al. | 152/209 R |
| 3,286,756 | 11/1966 | Ellenrieder et al. | 152/209 A |
| 3,405,753 | 10/1968 | Verdier | 152/209 A |
| 3,880,218 | 4/1975 | Brajenovich | 152/209 R |

FOREIGN PATENT DOCUMENTS

2253717 5/1974 Fed. Rep. of Germany ... 152/209 D
2263455 7/1974 Fed. Rep. of Germany ... 152/209 R

*Primary Examiner*—Edward C. Kimlin
*Assistant Examiner*—F. K. Wine
*Attorney, Agent, or Firm*—Connolly and Hutz

[57] ABSTRACT

The invention relates to a tire suitable for all-year-round use comprising a tread profile in which—looking in the running direction—one half of the tire is formed from profile blocks separated from one another while the other half of the tire has a substantially continuous profile interrupted only by lamellae. The two halves of the tire are best made of different rubbers of which the properties are adapted to the particular tread profile.

4 Claims, 2 Drawing Figures

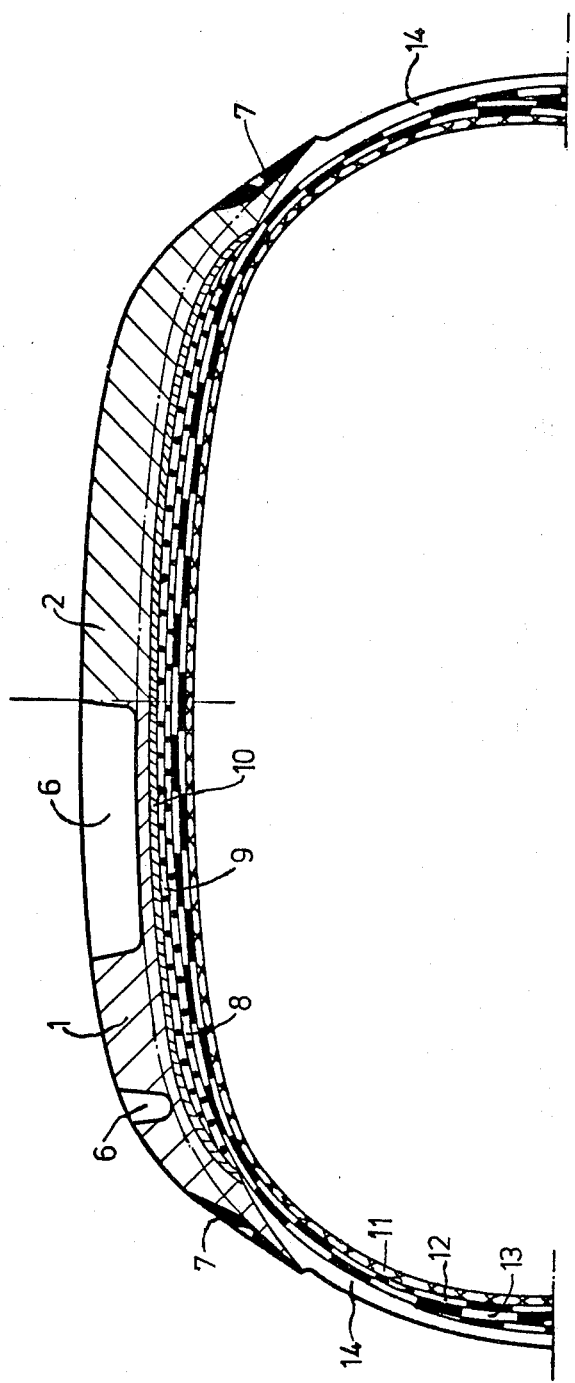
FIG. 2 (A-A)

TIRE HAVING AN ASYMMETRICAL TREAD PROFILE

This invention relates to a tire having an asymmetrical tread profile which is suitable for all-year-round use. Looking in the running direction, one half of the tire according to the invention is formed from separate profile blocks whilst the other half of the tire has a substantially continuous profile interrupted only by lamellae. The two halves of the tire are best made of different rubber of which the properties are adapted to the particular tread profile.

In the tire industry, it is standard practice to design a tire for the particular application envisaged. The result of this has been that, for some time now, summer tires and winter tires have been used for the different road conditions. In this connection, it has to be said that conventional winter tires are themselves a compromise on account of the different requirements which adhesion to snow and adhesion to ice have to satisfy. Thus, it has been shown in tests that, in the event of braking on ice, the M+S blocks heavily studded to obtain a good grip on snow are not significantly superior in their behaviour to corresponding summer tires.

On the other hand, there is an increasing demand among motorists for the all-year-round tire although it represents an even greater compromise in regard to winter road conditions, such as low temperatures, ice and snow, and summer road conditions. All-year-round tires are already commercially available, being essentially confined to finding—through their profiling—a favourable compromise for the above-mentioned requirements and optionally combining it with a corresponding compromise for the rubber mixture used.

In addition, DE-AS No. 12 24 630 relates to a tire having differently profiled tread zones to accommodate varying road conditions. In this known tire, the tread consists on one side of a fine profile, which is suitable for normal road conditions and on the other side of a rough profile which comes into effect on roads covered with snow and mud. However, this known tire is attended by the disadvantage that its grip is generally inadequate on snow- and ice-covered roads. To overcome this disadvantage, it is proposed in DE-OS No. 22 63 445—which relates to a tire of the type in question having a fine and rough profile—to provide at least one of the profiles with holes which act as suction cups and thus improve adhesion to ice.

By contrast, the tire according to the present invention has on one side of its tread a mixed profile formed by profile blocks, which is suitable both for normal road conditions and also for snow and mud, and on the other side of its tread a profiled surface interrupted only by lamellae which ensures good adhesion on ice- and snow-covered roads.

According to the invention, this tire has an asymmetrical tread profile, in that, looking in the running direction, the treads of both halves of the tire have different profiles and consist of different rubbers specifically adapted to the particular tread profile, one half of the tire having a mixed profile suitable for summer and winter conditions and consisting of interlocked profile blocks separated by grooves extending in and transversely of the running direction and the other half of the tire having a substantially continuous profile interrupted only by lamellae which is suitable for snow and ice and of which the lamellae are arranged at an angle of 15° to 45° to the running direction.

A tire such as this is suitable for all-year-round use without any need for additional measures to achieve good adhesion, even on snow and ice.

In one particular embodiment that half of the tire which has the mixed profile formed from profile blocks consists of a rubber suitable for summer tires whilst that half of the tire which has the profile interrupted by lamellae consists of a rubber suitable for winter tires. In another embodiment the actual ground contact area (positive contact area) of the particular half of the tire is dimensioned in such a way that the difference in wear between the two halves of the tire attributable to the different rubbers used is compensated.

In an preferred embodiment the number of lamellae in the corresponding half of the tire is gauged in such a way that from 50 to 100 lamellae have contact with the ground.

At least in one embodiment the half, which is provided with lamellae, is arranged on the outside of the tire.

Since the tires in question are normally radial-ply tires, it is best for the last ply to be directed towards the inside of the tire to avoid any conicity in the tire.

Tests have shown that very good adhesion of the tire according to the invention to ice is obtained in particular when the half of the tire which is provided with lamellae consists of a rubber mixture suitable for winter tires and has a large actual ground contact area, i.e. a high positive percentage of the tread. Adhesion is considerably improved if, as mentioned above, at least 50 to about 100 and preferably 60 to 90 lamellae per contact surface are in contact with the ground. By virtue of the very good adhesion to ice, optimal braking values are obtained even in the event of braking on ice. In addition, excellent lateral stability values are obtained even on dry roads.

One embodiment of the tire according to the invention is shown in FIG. 1 which is a plan view of the asymmetrical profile tread. The left-hand half (1) of the tread has the standard transversely interlocked block profile for summer tires which consists of the interlocked profile blocks (5) separated by the grooves (6) extending in and transversely of the running direction. Towards the middle of the tread, the block profile merges with the profile of the right-hand half (2) which has a substantially continuous surface interrupted only by lamellae (3,4) arranged obliquely of the running direction, so that a high positive percentage of the tread and excellent adhesion to ice are obtained.

FIG. 2 is a section through the tire on the line A—A in FIG. 1. The left-hand half (1) of the tread consists of a rubber suitable for summer tires which ends at the zenith of the tire where it merges with a rubber mixture suitable for winter tires of which the right-hand half (2) of the tire consists. In contrast to the left-hand half provided with profile grooves, the right-hand half has a substantially continuous profile interrupted only by the lamellae.

The other reference numerals in FIG. 2 have the following significations: (6) profile groove; (7) shoulder strip; (8) lowermost steel belt; (9) uppermost steel belt; (10) Nylon belt cover; (11) inner plate for tubeless tires; (12, 13) carcass layers; (14) side wall.

The tire according to the invention may be made of any suitable natural or synthetic rubber of which the vulcanisate values comprise a Shore hardness of from 45 to 80 and a modulus of 6 to 15 MPa at 300% elongation. Natural rubber, styrene-butadiene rubber, polybutadiene and ethylene/propylene terpolymer rubber are particularly suitable. The weight of the tire is comparable with that of a standard pneumatic tire. The rubber mixtures used for the tire in FIGS. 1 and 2 and their properties are described by way of example in the following:

Left-hand half of tire:
  Styrene-butadiene rubber—100.0 parts by weight
  Carbon black N-330—70.0 parts by weight
  Aromatic mineral oil—26.5 parts by weight
  Stearic acid—2.0 parts by weight
  Paraffin hydrocarbon—1.5 parts by weight
  N-isopropyl-N'-phenyl-p-phenylene diamine—2.5 parts by weight
  Zinc oxide—3.0 parts by weight
  2,2,4-trimethyl-1,2-dihydroquinoline—1.3 parts by weight
  2-mercaptobenzothiazole—0.3 part by weight
  Sulfur—1.8 parts by weight
  Mixture plasticity/80° C.
  Defo hardness/Defo elasticity—1250/17
  Tensile strength (MPa)—16.8
  Breaking elongation (%)—450
  Modulus at 300% elongation (MPa)—11.7
  Pohle tear propagation resistance (N)—230
  Hardness at 20° C. (Shore A)—64
  Shock elasticity (DIN 53 512) (%)—33
  DIN-abrasion (Emery No. 60) (mm$^3$)—63

Right-hand half of tire:
  Natural rubber—70.0 parts by weight
  Butadiene rubber—30.0 parts by weight
  Carbon black N-332—70.0 parts by weight
  Aromatic mineral oil—41.2 parts by weight
  Stearic acid—2.0 parts by weight
  Paraffin hydrocarbon—1.0 part by weight
  N-isopropyl-N'-phenyl-p-phenylene diamine—2.0 parts by weight
  2,2,4-trimethyl-1,2-dihydroquinoline—1.5 parts by weight
  Zinc oxide—5.0 parts by weight
  Benzothiazyl-2-sulfene morpholide—1.1 parts by weight
  Tetramethyl thiuram monosulfide—0.1 part by weight
  Sulfur—1.43 parts by weight
  Mixture plasticity/80° C.
  Defo hardness/Defo elasticity—775/18
  Tensile strength (MPa)—15.5
  Breaking elongation (%)—480
  Modulus at 300% elongation (MPa)—8.6
  Pohle tear propagation resistance (N)—205
  Hardness at 20° C. (Shore A)—55
  Shock elasticity (DIN 53 512) (%)—38
  DIN-abrasion (Emergy No. 60) (mm$^3$)—109

What is claimed is:

1. A tire having an asymmetrical tread profile, characterised in that, looking in the running direction, the treads of both halves of the tire have different profiles and consist of different rubbers specifically adapted to the particular tread profile, one half of the tire having a mixed profile suitable for wet or dry summer and winter conditions and consisting of interlocked profile blocks separated by grooves extending in and transversely of the running direction and the other half of the tire having a continuous profile interrupted only by lamellae which is suitable for snow and ice and of which the lamellae are arranged at an angle of 15° to 45° to the running direction and gauged in such a way that from 50 to 100 lamellae have contact with the ground.

2. A tire as claimed in claim 1, characterised in that the half of the tire which has the mixed profile formed from profile blocks consists of a rubber suitable for wet and dry summer and winter tires while the half of the tire which has the profile interrupted by lamellae consists of a rubber suitable for snow and ice winter tires.

3. A tire as claimed in claim 2, characterised in that the actual ground contact area of the particular half of the tire is dimensioned in such a way that the difference in wear between the two halves of the tire attributable to the different rubbers used is compensated.

4. A tire as claimed in claim 3, characterised in that the half of the tire which is provided with lamellae is arranged on the outer side of the tire.

* * * * *